US010014932B2

(12) United States Patent
Erdmann et al.

(10) Patent No.: US 10,014,932 B2
(45) Date of Patent: Jul. 3, 2018

(54) METHOD AND APPARATUS FOR DETERMINING A SIGNAL TRANSMISSION QUALITY OF A LIGHT TRANSMISSION PATH

(71) Applicant: Lemförder Electronic GmbH, Espelkamp (DE)

(72) Inventors: Thomas Erdmann, Stemwede (DE); Jorg Jahn, Bünde (DE)

(73) Assignee: Lemförder Electronic GmbH, Espelkamp (DE)

( * ) Notice: Subject to any disclaimer, the term of this patent is extended or adjusted under 35 U.S.C. 154(b) by 226 days.

(21) Appl. No.: 15/038,881

(22) PCT Filed: Oct. 27, 2014

(86) PCT No.: PCT/EP2014/072942
§ 371 (c)(1),
(2) Date: May 24, 2016

(87) PCT Pub. No.: WO2015/078640
PCT Pub. Date: Jun. 4, 2015

(65) Prior Publication Data
US 2017/0005721 A1    Jan. 5, 2017

(30) Foreign Application Priority Data
Nov. 27, 2013   (DE) .................. 10 2013 224 258

(51) Int. Cl.
*H04B 10/07*    (2013.01)
*F16H 59/10*    (2006.01)
(Continued)

(52) U.S. Cl.
CPC .......... *H04B 10/07* (2013.01); *F16H 59/105* (2013.01); *G01D 5/35351* (2013.01); *G01J 1/16* (2013.01); *G01J 1/42* (2013.01); *H04B 10/0775* (2013.01)

(58) Field of Classification Search
CPC .... H04B 10/07; G01J 1/42; G01J 1/16; F16H 59/105
(Continued)

(56) References Cited

U.S. PATENT DOCUMENTS

| 8,050,570 B2 | 11/2011 | Schmitz et al. |
| 8,291,281 B2 * | 10/2012 | Yoshii ................... H04L 1/0009 714/752 |
| 2003/0005385 A1 * | 1/2003 | Stieger .................. H03M 13/35 714/758 |

FOREIGN PATENT DOCUMENTS

| DE | 39 39 191 A1 | 5/1991 |
| DE | 195 10 304 C1 | 2/1996 |

(Continued)

OTHER PUBLICATIONS

International Search Report dated Mar. 23, 2015 in International Application No. PCT/EP2014/072942, 3 pages, German Language.
(Continued)

*Primary Examiner* — Seung C Sohn
(74) *Attorney, Agent, or Firm* — Brinks Gilson & Lione

(57) ABSTRACT

The approach relates to a procedure for determining a signal transmission quality of a light transmission path, which consists of a light transmitter on one end and a light receiver on its other end. A transmitter code is received in a first step. The transmitter code hereby represents a signal which is transmitted from the light transmitter to the light receiver. In a further step the receiver code is read in. The receiver code hereby represents a signal which was provided by the light receiver by using the transmitter code. The determining of a degree of correspondency between the transmitter code and the receiver code is performed in a final step of determining, in order to define the signal transmission quality of the light transmission path.

20 Claims, 4 Drawing Sheets

Figure 1:
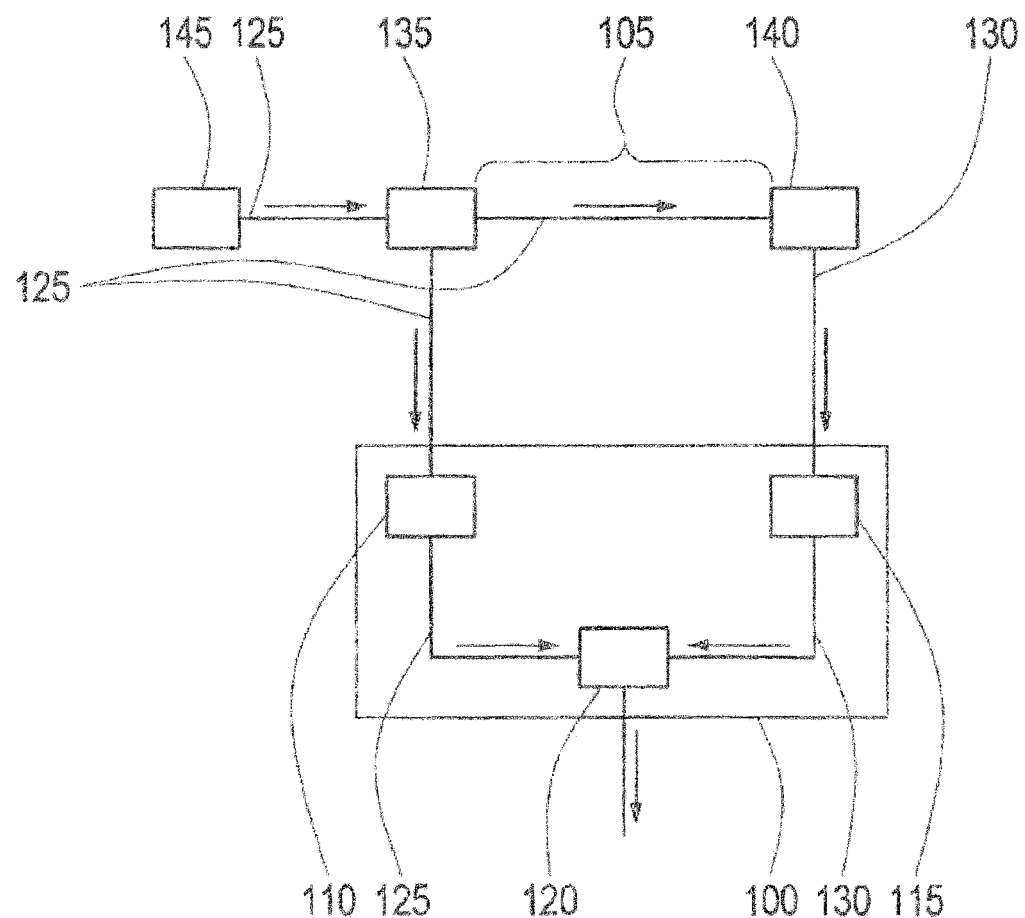

(51) Int. Cl.
  *G01D 5/353*  (2006.01)
  *H04B 10/077*  (2013.01)
  *G01J 1/16*  (2006.01)
  *G01J 1/42*  (2006.01)

(58) Field of Classification Search
  USPC .......... 250/206, 559.4, 559.45; 714/752, 758
  See application file for complete search history.

(56) References Cited

FOREIGN PATENT DOCUMENTS

| | | |
|---|---|---|
| DE | 10 2011 000 857 A1 | 8/2012 |
| EP | 0 913 940 A2 | 5/1999 |
| EP | 1 271 809 A2 | 1/2003 |
| EP | 2 490 045 A1 | 8/2012 |

OTHER PUBLICATIONS

Written Opinion of the International Search Authority dated Mar. 23, 2015 in International Application No. PCT/EP2014/072942, 6 pages, German Language.
English Language Translation of International Search Report dated Mar. 23, 2015 in International Application No. PCT/EP2014/072942, 2 pages.
Office Action of Priority Application DE102013224258.1 dated Mar. 20, 2014, 5 pages, German Language.
Sliwczynski, Lukasz et al., "Bit Error Rate Tester for 10 Gb/s Fibre Optic Link", Nov. 2010, pp. 70-73, vol. 1, No. 2, *Advances in Electronics and Telecommunications*, Poland.

\* cited by examiner

METHOD AND APPARATUS FOR DETERMINING A SIGNAL TRANSMISSION QUALITY OF A LIGHT TRANSMISSION PATH

This application is a filing under 35 U.S.C. § 371 of International Patent Application PCT/EP2014/072942, filed Oct. 27, 2014, and claims the priority of DE 10 2013 224 258.1, filed Nov. 27, 2013. These applications are incorporated by reference herein in their entirety.

The present disclosure relates to a procedure for determining a signal transmission quality of a light transmission path as well as to a corresponding device.

Automatic gearbox selection levers of today's vehicles typically consist of non-contact Hall effect sensors for the measuring of positions of the automatic gearbox selector lever. Expensive magnets and digital or analogue Hall-ICs are generally used for this purpose.

In order to ensure the function of such applications, extensive simulation procedures and tests are often performed during the development. The function may e.g. be influenced by external magnetic fields.

In today's vehicles, light barriers are only used in a limited way. Rotary selectors or steering angle sensors, which work according to the light barrier principle, are common. The main reason is that environmental influences such as dirt or condensation can complicate the use of light barriers in vehicles. For example, light barriers cannot be sealed with casting compounds. Another reason for their limited use is that all electronic parts should be mounted on one flat electronic circuit board in order to be more cost efficient. This reduces the degrees of freedom for an optimal positioning of a light barrier within a mechatronical system. Applications with switches or gear selectors furthermore often include sources of interference in form of illumination LEDs.

On the other hand, light barriers are very common in industrial applications. Filter technologies for certain light frequencies, pulsed light or combinations of these two procedures are hereby used in order to eliminate environmental influences. DE 10 2008 009 180 A1, DE 10 2011 000 857 A1 and DE 39 39 191 A1 describe common light barrier applications. But a disadvantage of these procedures in view of a use in vehicles is, that not all external influences can be detected in a sufficiently secure manner, or that these may require an extensive effort that cannot be realized in a cost efficient way. Light barriers may for example be affected by stray light. When several transmitters or light sources such as illumination LEDs are used, stray light may unnoticingly affect a receiver. Stray light may arise by means of condensation on the transmitter, whereby the light of the transmitter is emitted diffusely.

In view of the above, the present approach provides an improved procedure and an improved device for determining a signal transmission quality of a light transmission path according to the main claims. Preferred embodiments are derived from the sub-claims and from the following description.

A procedure for determining a signal transmission quality of a light transmission path, which consists of a light transmitter on one end and a light receiver on its other end, comprises the following steps:

Receiving of a transmitter code, whereby the transmitter code represents a signal which is transmitted from the light transmitter to the light receiver;

Reading in of a receiver code, whereby the receiver code represents a signal which was provided by the light receiver by using the transmitter code; and Determining of a degree of correspondency between the transmitter code and the receiver code, in order to define the signal transmission quality of the light transmission path.

The signal transmission quality can be understood to be a value, which indicates how accurate a signal has been transmitted from a transmitter to a receiver. The higher the degree of correspondency between the transmitted signal and the received signal, the better the signal transmission quality. A light transmission path can be understood to be a path of a light beam. The light beam can be reflected once or several times in order to reach across the light transmission path. The light transmission path may e.g. refer to the light path of a light barrier. The light beam can be transmitted from a light transmitter via a light transmission path to a light receiver. The light transmitter hereby represents one end of the light transmission path and the light receiver another end of the light transmission path. A light transmitter can be understood to be a component that is designed to convert electrical signals into light. It may e.g. refer to an LED (also called Light Emitting Diode). A light receiver, also referred to as photo receiver, can be understood to be a sensor that is designed to convert light into electrical signals. It may e.g. refer to a photodiode.

The light transmitter can be configured to send a transmitter code. A transmitter code can be understood to be a code that is sent in form of a light beam, such as e.g. light within the red wavelength range (red light) or infrared light, to the light receiver. The code may e.g. be a digital code word with a specified bit sequence by means of which the intensity of the light is varied. The light receiver may be configured to receive the transmitter code. Further, the light receiver may be configured to provide a receiver code by using the transmitter code. The receiver code may be an electrical signal which represents the transmitter code, provided that the light signal which carries the transmitter code was received by the light receiver. The transmitter code and the receiver code are comparable to each other. A degree of correspondency between the transmitter code and the receiver code can be determined in this way. Thus, it can be determined how many of the respective code sections of the transmitter code and of the receiver code correspond to each other. A degree of correspondency can be understood to be a number of matching code sections. Depending on the number of matching code sections, the signal transmission quality of the light transmission path can be defined. A full correspondency of the transmitter and the receiver codes can be equated to the best possible signal transmission quality.

The present approach is based in the knowledge that a light barrier can be limited in its function due to external influences. For example, dirt or condensation can settle on a light transmitter and/or a light receiver of the light barrier. Thereby, a light beam that is emitted from the light transmitter can be emitted at an altered angle or the light receiver may only detect a portion of the emitted light beam. This may cause a malfunction or a failure of the light barrier. In order to prevent such interferences that are caused by external influences, the light emitter can be configured to send a code. The light receiver may be configured to receive this code. When the transmitted code is now compared with the received code, it can be detected if the light transmission path is affected by external influences. This may particularly be the case if the two codes vary from each other, e.g.

because a portion of the light, which carries the sent code, does not reach the receiver due to undesired deflections during the transmission.

The advantage of the present approach is that it is possible to reliably detect external influences that could affect the function of a light barrier with technically simple and very cost-effective means. Due to the resulting increased operational reliability, such a light barrier can be used in vehicles in a cost efficient way, for example for determining a position of the gear selector lever for an automatic transmission of a motor vehicle in a housing.

According to one embodiment of the present approach, the procedure may comprise a step of measuring the receiver code signal strength of the signal that is carried by the receiver code. Further, the procedure may hereby comprise a step of determining a deviation of the receiver code signal strength from a predetermined value. A receiver code signal strength can be understood to be a level of the signal that is carrying the receiver code. The signal carrying the receiver code may e.g. be an analogue signal. A predetermined value can be understood to be a stored reference value of the receiver code signal strength. The receiver code signal strength can be compared to the predetermined value, in order to define a deviation of the receiver code signal strength from the predetermined value. For example, the predetermined value may represent a minimum signal strength of the signal that is carrying the receiver code. The receiver code signal strength can be influenced by the physical condition of the light transmission path. By means of measuring the receiver code signal strength and by determining the deviation of the receiver code signal strength from the predetermined value, it can be detected if the signal that is carrying a transmitter code was sent to the light receiver with the minimum signal strength so that the light receiver can provide the signal that is carrying the receiver code by using the signal that is carrying the transmitter code, independent of the physical condition of the light transmission path. The determination of such a deviation can also be of help when it comes to making an error diagnosis.

According to one embodiment of the present approach, the procedure may comprise a step of adjusting a transmitter code signal strength of a signal that is carrying the transmitter code by using the deviation of the receiver code signal strength from the predetermined value. A transmitter code signal strength can be understood to be a level of the signal that is carrying the transmitter code. The signal that is carrying the transmitter code can be an optical signal such as light within the red wavelength range or infrared light. If the receiver code signal strength deviates from the predetermined value, e.g. due to condensation or dirt on the light transmitter and/or the light receiver, the transmitter code signal strength can be increased by means of e.g. an amplification of the transmitting power of the light transmitter. In this way it can be accomplished that the signal that is carrying the transmitter code can reach the light receiver even if the light transmission path, although being enabled, is impaired due to undesired external influences. Furthermore, the advantage of adjusting the transmitter code signal strength is, that a deterioration of the light transmission path can be at least partially removed, for example if the condensation on the light emitter can be reduced by increased heat of the light emitter.

According to one embodiment of the present approach, at least two different actions can be performed within the step of adjusting, in order to change the transmitter code signal strength. For example, the transmitter code signal strength can be adjusted by means of supplying power to the light transmitter, possibly an LED, via at least two resistors with different values and/or if an additional light transmitter is switched on. Due to the fact that at least two different actions are carried out within the step of adjusting, it is possible to adjust the transmitter code signal strength to a degree of condensation on the light transmitter and/or light receiver in an efficient and gentle way. This may prolong the lifetime of the light transmitter and/or counteract a malfunction in the light transmission path.

According to one embodiment of the present approach, the procedure may comprise another step of receiving a further transmitter code. The further transmitter code can hereby represent a further signal which is transmitted from the light transmitter to the light receiver. The additional transmitter code can be different from the transmitter code received in the step of receiving. Since the transmitter code and the additional transmitter code are different from each other, it can be prevented that the physical condition of the light transmission path is influenced by repeatedly transmitting the same transmitter code. Thus, signal transmission errors can be prevented.

According to one embodiment of the present approach, a binary code can be received as transmitter code in the step of receiving and/or a binary code can be read in as receiver code in the step of reading. A binary code can generally be understood to be a code by means of which information can be displayed by sequences of two different symbols, such as 1 and 0 or true and false. Advantageously, binary codes can be displayed with simple and inexpensive technical means and processes in a cost efficient and resourceful manner.

Furthermore, according to one embodiment of the present approach, at least one additional transmitter code can be received within the step of receiving. The at least one additional transmitter code can hereby represent a signal that is sent by at least one additional light transmitter to at least one additional light receiver. The at least one additional light transmitter can be arranged at one end, and the at least one additional light receiver at the other end of the at least one additional light transmission path. The at least one additional transmitter code can hereby be different from the transmitter code.

In the step of reading, at least one additional receiver code can be read in. The at least one additional receiver code can hereby represent a signal that is provided by the at least one additional light receiver by using the at least one additional transmitter code.

Furthermore, in the step of determining, a degree of correspondency between the at least one additional transmitter code and the at least one additional receiver code can be determined, in order to define the signal transmission quality of the at least one additional light transmission path.

Such a dual channel version ensures a high reliability of the procedure in a cost efficient manner and without high material costs. Thus, such a procedure can also be used in areas with a high level of safety requirements, such as in the area of motor vehicles. Due to the fact that the at least one additional transmitter code is different from the transmitter code, it is possible to ensure that the light transmitter and the at least one additional light transmitter are not active at the same time. Thus, a mutual functional impairment by means of stray light can be avoided.

According to one embodiment of the present approach, it is possible to receive a code in the step of receiving as an additional transmitter code that corresponds to an inverted transmitter code. An inverted transmitter code can generally be understood to be a logical inversion or a digit-wise inverting of the code of a code sequence that is representing the transmitter code, such as of a digital code word. In this way it is possible to produce the largest possible difference between the transmitter code and the at least one additional transmitter code in a particularly simple way and with a low calculation effort.

The present approach further produces a device for determining a signal transmission quality of a light transmission path, which consists of a light transmitter on one end and a light receiver on its other end. The device can feature the following characteristics:

a receiving unit for the receiving of a transmitter code, whereby the transmitter code represents a signal which is transmitted from the light transmitter to the light receiver;

a reading unit for the reading in of a receiver code, whereby the receiver code represents a signal which was provided by the light receiver by using the transmitter code; and a detection unit for determining a degree of correspondency between the transmitter code and the receiver code, in order to define the signal transmission quality of the light transmission path.

A device can be an electrical device that processes sensor signals and that releases control signals in correspondence to it. The device can consist of one or more suitable interfaces that can be designed as hardware and/or software. When a hardware version is used, the interfaces can e.g. be part of an integrated circuit which processes functions of the device. The interfaces can also be separate, integrated circuits or at least consist of at least partially discrete components. When a software version is used, the interfaces can be software modules, which can be found on a microcontroller along with other software modules. The device can preferably be an adjusting device, by means of which adjustments can be done via control elements. Such an adjusting device can e.g. consist of a gear selector lever, a device for adjusting the suspension setup.

The present approach furthermore produces an adjusting device, which features a device to perform the procedure according to one of the above-mentioned embodiments. Such an adjusting device might e.g. be a device for adjusting a suspension setup. Preferably, the present approach creates a gear selector lever for an automatic transmission. Usually, a gear selection lever is used for automatic transmissions to select back and forth between the different gear selection stages such as e.g. N for neutral, D for drive and R for reverse. Further gear selection stages such as P for park are also selectable via the gear selection lever. Information about the gear selection stage that was selected by means of the gear selection lever can be processed mechanically or electronically as in a shift-by-wire gear selection system. This information can be passed on via a transmission control device, possibly after a verification by the transmission control device, to the vehicle transmission in order to initiate a shifting of the vehicle transmission according to the chosen gear selection stage. A gear selection lever can preferably be a gearshift lever or a rotary selector. It is further preferred that the gear selection lever is tied into a shift-by-wire system. The gear selection lever can consist of a device to perform the procedure according to one of the embodiments that were described earlier. Such a gear selection lever features a high reliability and precision, and can be produced in a significantly more cost efficient manner than conventional gear selector levers.

Also advantageous is a computer program product in which the program code can be saved on a machine-readable carrier such as a semiconductor memory, a hard drive or on an optical storage and which can be used to perform the procedure according to one of the embodiments that were described before, if the program is run on a computer or device.

Figure 2:
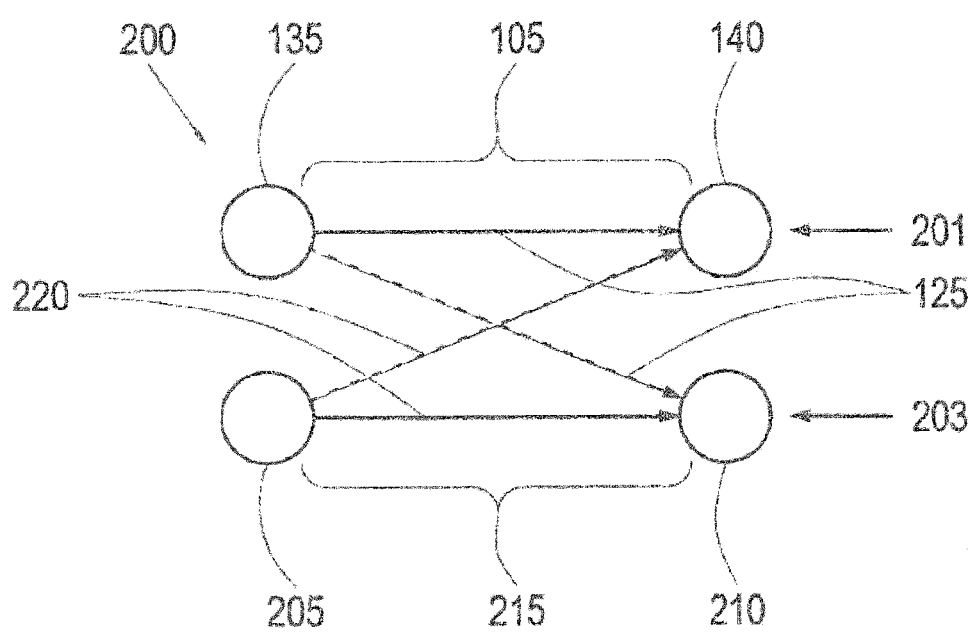
Figure 3:
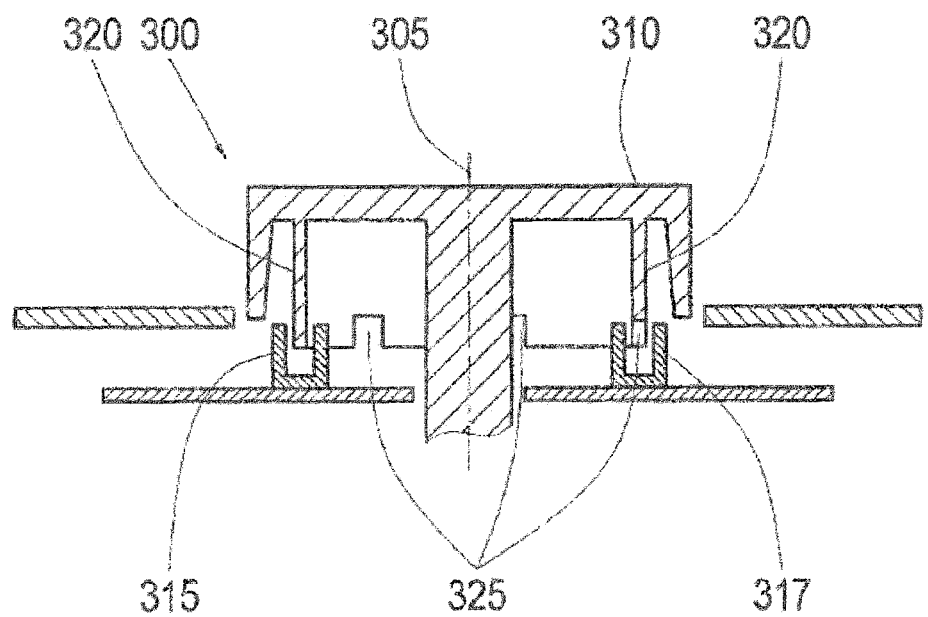
Figure 4:
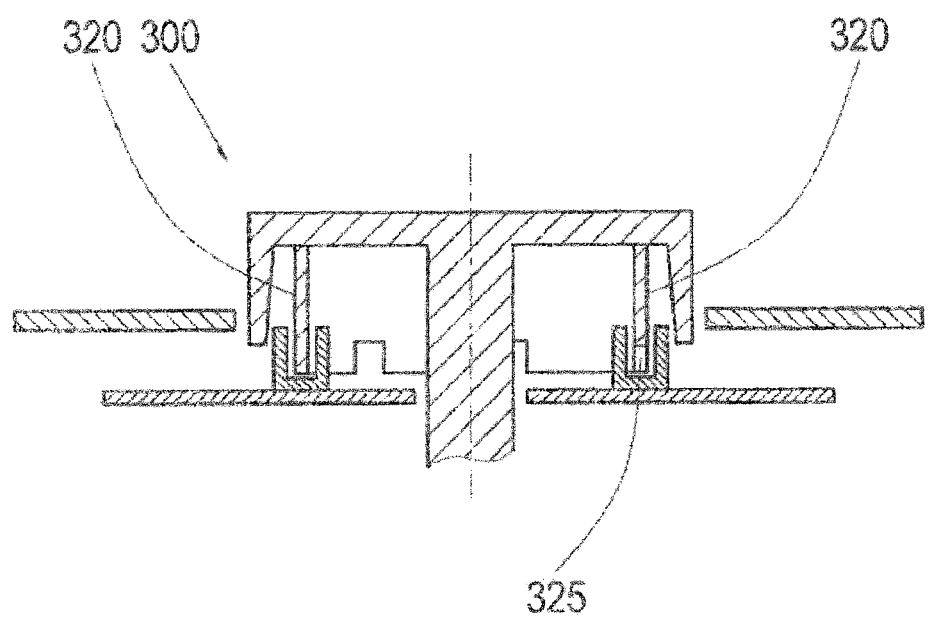
Figure 5:
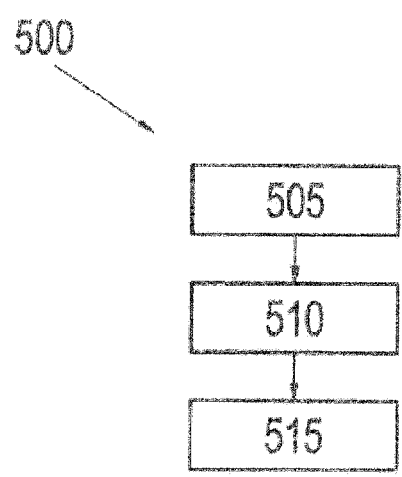

The approach is illustrated and explained in more detail by means of the attached drawings. It is shown:

FIG. 1 a schematic depiction of a device for determining a signal transmission quality of a light transmission path according to an embodiment of the present approach;

FIG. 2 a schematic depiction of a photoelectric sensor arrangement according to an embodiment of the present approach;

FIG. 3 a cross sectional depiction of a gear selection lever for an automatic transmission for use with an embodiment of the present approach;

FIG. 4 a cross sectional depiction of a gear selection lever for an automatic transmission for use with an embodiment of the present approach; and FIG. 5 a flow chart of a procedure for determining a signal transmission quality of a light transmission path according to an embodiment of the present approach.

In the following description of preferred embodiments of the present approach, same or similar reference signs are used for those depicted elements in the various figures which have a similar function, whereby a repeated description of these elements is omitted.

FIG. 1 depicts a schematic depiction of a device 100 for determining a signal transmission quality of a light transmission path 105 according to an embodiment of the present approach. The device 100 comprises a receiver unit 110, a reading unit 115 and detection unit 120. The receiver unit 110 is configured to receive a transmitter code 125. The reading unit 115 is configured to receive a receiver code 130. The receiver unit 110 and the reading unit 115 are both connected to the detection unit 120. The detection unit 120 is configured to receive the transmitter code 125 and the receiver code 130. The detection unit 120 is furthermore configured to determine a degree of correspondency between the transmitter code 125 and the receiver code 130. A signal transmission quality of the light transmission path 105 can be defined on the basis of the degree of correspondency.

Receiver unit 110 is connected to a light transmitter 135 via an interface of device 100. Reading unit 115 is connected to a light receiver 140 via an additional interface of device 100. Light transmitter 135 is arranged on one end of the light transmission path 105. Light receiver 140 is arranged on another end of the light transmission path 105. Light transmitter 135 is configured to send transmitter code 125 to light receiver 140 via the light transmission path 105. The light transmission path 105 may e.g. refer to the light path of a forked photoelectric sensor or a reflex light barrier. Light transmitter 135 and light receiver 140 can be arranged with a mutual distance of 3 mm up to 120 mm. According to an embodiment of the present approach, light transmitter 135 and light receiver 140 can be arranged in a gear selection lever for an automatic transmission of a vehicle. Light transmission path 105 can hereby be enabled or blocked by e.g. a rotary selector or a push button of the gear selection lever. Light transmitter 135 is further configured to send transmitter code 125 in form of e.g. an electric signal to receiver unit 110. Light transmitter 135 can e.g. transmit a red light- or an infrared light signal in order to transmit transmitter code 125. Light receiver 140 is configured to receive transmitter code 125. Furthermore, light receiver 140 is configured to provide receiver code 130 by using transmitter code 125. Receiver code 130 hereby represents transmitter code 125, provided that it was received by light receiver 140. Light receiver 140 is further configured to send transmitter code 130 in form of a corresponding signal to reading unit 115.

Transmitter code 125 and receiver code 130 may be corresponding or may be different from each other. It is for example possible that transmitter code 125 and receiver code 130 can e.g. differ from each other if the light transmission path 105 is impaired due to undesired external influences. Light transmission path 105 can e.g. be impaired by means of condensation or dirt particles that have settled on light transmitter 135 and/or on light receiver 140.

Optionally, transmitter code 125 can be provided by a coding unit 145. Coding unit 145 can be made in the form of a microcontroller and it can be connected to light transmitter 135 via a digital interface such as a UART (universal asynchronous receiver/transmitter). According to an embodiment of the present approach, coding unit 145 can be configured to send out transmitter code 125 as a binary code. Light transmitter 135 can be configured to receive transmitter code 125 from coding unit 145 and to send out transmitter code 125 in form of a light signal to light receiver 140.

Detection unit 120 can be configured to send out the degree of correspondency between transmitter code 125 and receiver code 130 in form of a corresponding signal (depicted by the arrow pointing downwards out of detection unit 120 in FIG. 1) to an additional interface of device 100. The additional interface can e.g. be connected to a control unit (which is not depicted in FIG. 1). The control device can be configured to define the signal transmission quality of light transmission path 105 on the basis of the degree of correspondency. Depending on the signal transmission quality, the control unit can send out e.g. appropriate control signals to a further device such as the automatic transmission. It is further possible that detection unit 120 directly determines the degree of correspondency and subsequently defines the signal transmission quality of the light transmission path 105, which is depicted by the arrow that is pointing downwards out of unit 120, as the corresponding signal.

FIG. 2 shows a schematic depiction of a photoelectric sensor arrangement 200 according to an embodiment of the present approach. The photoelectric sensor arrangement 200 comprises a first light barrier 201 and a second light barrier 203. The first light barrier 201 consists of light transmitter 135 as first transmitter and light receiver 140 as first receiver. The second light barrier 203 consists of an additional light transmitter 205 as second transmitter and an additional light receiver 210 as second receiver. Light transmitter 135 and light receiver 140 each form one respective end of the light transmission path 105. The additional light transmitter 205 and the additional light receiver 210 each form one respective end of an additional light transmission path 215. Light transmitter 135 is configured to send out transmitter code 125 to light receiver 140. The additional light transmitter 205 is configured to send out an additional transmitter code 220 to the additional light receiver 210. The at least one additional transmitter code 220 can hereby be different from the transmitter code 125. It is for example possible that transmitter code 125 corresponds to a digital code sequence of "010101". Optionally, the additional transmitter code 220 can represent a logical inversion of transmitter code 125, so that the additional transmitter code 220 according to the before mentioned example corresponds to a digital code sequence of "101010". Light barriers 201, 203 can be arranged adjacent to each other. In such a case it is possible that crosstalk occurs between the light barriers 201, 203. Cross talk can generally be understood to be an undesired mutual interference of separate signal channels. It is for example possible that a light signal that is carrying transmitter code 125 is deflected onto the additional light receiver 210 and/or that the light signal that is carrying the additional transmitter code 220 is deflected onto light receiver 140 in form of stray light.

FIG. 3 shows a cross sectional depiction of a gear selection lever 300 for an automatic transmission for use with an embodiment of the present approach. Gear selection lever 300 is designed in the form of a rotary selector and push button with a central axis 305. Rotary axis 305 is arranged perpendicular to gear selection lever 300. Gear selection lever 300 can be turned in one or two directions around rotary axis 305. Additionally, gear selection lever 300 can be pressed down in the direction of rotary axis 305. Gear selection lever 300 can e.g. be designed to cause a shifting of gears in an automatic transmission when it is pressed and/or turned. FIG. 3 shows gear selection lever 300 in a state where it is not pressed, which can also be called the nominal position.

Gear selection lever 300 is intended to have a hollow rotatable element 310. Furthermore, gear selection lever 300 is provided with a first forked photoelectric sensor 315 and a second photoelectric sensor 317. The forked photoelectric sensors 315, 317 are arranged opposite to each other. The rotatable element 310 features a ledge 320 in an outer edge area. Ledge 320 is to be arranged with at least three recesses 325. Ledge 320 is positioned between each respective light transmitter and light receiver of the forked photoelectric sensors 315, 317. The light transmitter and the light receiver of the first forked photoelectric sensor 315 can e.g. be light transmitter 135 and light receiver 140 as it is depicted in the FIGS. 1 and 2. The light transmitter and the light receiver of the second forked photoelectric sensor 317 can e.g. be the additional light transmitter 205 and the additional light receiver 210 as it is depicted in FIG. 2. Ledge 320 with the recesses 325 is configured to enable or block the light transmission path of the first forked photoelectric sensor 315 and/or the additional light transmission path of the second forked photoelectric sensor 317 when the rotatable element 310 is pressed and/or turned. In the nominal position of gear selection lever 300 as it is depicted in FIG. 3, ledge 320 can be arranged in such a way in the first forked photoelectric sensor 315, that it at least partially blocks the light transmission path. Thus, there is no signal transmission (also called signal 00). On the other hand, a recess 325 can be arranged in the second forked photoelectric sensor 317 in order that the additional light transmission path is fully enabled, so that there is a signal transmission (also called signal 11).

FIG. 4 shows a cross sectional depiction of a gear selection lever 300 for an automatic transmission for use with an embodiment of the present approach. In contrast to FIG. 3, FIG. 4 shows gear selection lever 300 in a state where it is pressed. In the pressed position, ledge 320 can be arranged in such a way in the first forked photoelectric sensor 315, that it fully blocks the light transmission path. Thus, as in the nominal position shown in FIG. 3, there is no signal transmission (signal 00). On the other hand, it is possible to arrange recess 325 within the second forked photoelectric sensor 317 in such a way, that it at least partially blocks the additional light transmission path. Thus, there is also no signal transmission in the second forked photoelectric sensor 317 (signal 00). It is for example possible to initiate a gear change in the automatic transmission by means of pressing the gear selection lever 300.

In the following, an embodiment of the present approach will be explained once more in other words by means of the FIGS. 1 to 4.

The present approach offers an economical procedure in which one or more light barriers can be used in a gear selection application in a way that is immune to interferences. A light barrier can be understood to be a light path with a transmitter and receiver that can be interrupted by objects. The transmitter can also be referred to as light transmitter, the receiver also as light receiver. The light barrier serves to detect movements in e.g. the longitudinal or rotational direction. Inexpensive standard components can be used herein. Additionally, this procedure can be immune to external influences. If one sensor fails, the procedure can still ensure the availability of a system that is operating the procedure. This can be achieved by a dual-channel version of the system.

The procedure can be a simple evaluation procedure, which can be implemented by using a few parts that are produced in mass production, and which can be obtained in an inexpensive way due to their simple design. SMD forked photoelectric sensors (SMD=surface mounted device) can be used for this purpose. It is possible to increase the operational safety and to make the light barrier more diagnosable by means of an evaluation procedure. Thus, this evaluation procedure can also be used in security applications. In order to perform the evaluation procedure, free resources in a microcontroller can be used, which can bring further economical benefits.

A security against external influences is achieved by means of sending a digital code word as the transmitter code 125 and by the receiving of this code word on the same channel. An asynchronous UART transmits a specific bit sequence to the LED of the light barrier, also called light transmitter 135. A UART can be understood to be a peripheral unit in common microcontrollers. The coupled photoelectric receiver, also called light receiver 140, passes the received signal back to the UART in form of a receiver code 130. The microcontroller, such as the detection unit 120, compares the transmission and the reception as to their identity. If this has been confirmed, it can be reliably assumed that the light barrier is unattenuated and that it works properly. The code word can be varied in cycles. It is furthermore possible that different channels use different code words. The code words can e.g. be inverted. In this way, adjacent transmitters will not be active at the same time, by means of which stray light can be prevented. The activation of the light barriers can be done by the microcontroller in a background interrupt mode. A corresponding result can be communicated by means of flags in a foreground application.

In order to ensure a certain level strength, it is possible to periodically measure the level of an analogue receiver signal, such as the signal that is carrying transmitter code 130, and to compare it to a reference value. If the level drops below the reference value, e.g. due to a temporary condensation on the transmitter and/or on the receiver, the transmission strength can be increased. The hereby resulting heat of the LED can furthermore be used to reduce the condensation. This can be accomplished in at least two stages, e.g. by a switching over to other resistors. If the level corresponds to the reference value again, the transmission strength can be reduced, to e.g. reduce the power consumption or in order not to permanently damage the LED, since the transmitter LED may possibly be supplied with slightly too much power.

If at least two light barriers are used, the functional reliability with reference to safety requirements for a dual-channel version, such as e.g. ASIL B, are fulfilled as well. Since it is possible to use low-cost SMD standard components, a two-channel version can still be realized within a reasonable cost range. When at least two receivers are used, it is furthermore also possible to detect a motion direction of a lever or of a rotary selector, which is necessary for a cost-efficient incremental sensor system.

Since a malfunction of one light barrier can be clearly detected, the reliability of the system can be ensured by means of a second channel. Thus, an expensive majority decision device is not necessary. This procedure can be basically used for any kind of light barrier, such as e.g. forked photoelectric sensors or reflex light barriers. Furthermore, the procedure is suitable for the use in incremental and absolute encoders. Standard components such as forked photoelectric sensors can e.g. be used in rotary, linear or web-guided systems.

When several light barriers are used, it is possible to always use two light barriers on one UART. Hereby, the first light barrier can be operated in a normal manner, and the second light barrier can be operated in a logically inverted manner, as it is shown in FIG. 2.

Generally, no additional resources are required in a microcontroller, since the I/O-pins are needed anyway. The UARTs are available in common 32-bit ICs. By means of an interrupt version, it is possible to keep the background software load very low.

The procedure can be used in order to detect a push and/or tilt movement in addition to a rotary and/or linear movement. In order to accomplish this, an interruption ring, like e.g. the rotary element 310 with the ledge 320 as it is depicted in FIGS. 3 and 4, can be encoded in such a way, that e.g. a push movement produces a different interruption coding of the forked photoelectric sensor. In FIG. 4, an interruption of all light barriers, here dual forked photoelectric sensors, occurs when a rotary selector, also called gear selection lever 300, is pushed down. Such a result can only occur in the system as it is exemplified in the FIGS. 3 and 4, when the rotary selector is pressed.

FIG. 5 shows a schematic depiction of a procedure 500 for determining a signal transmission quality of a light transmission path according to an embodiment of the present approach. The light transmission path consists of a light transmitter on its one end and a light receiver on its other end. A transmitter code is received in a first step 505. The transmitter code hereby represents a signal which is transmitted from the light transmitter to the light receiver. This is followed by a step 510 for the reading in of a receiver code. The receiver code hereby represents a signal which was provided by the light receiver by using the transmitter code. Finally, the determining of a degree of correspondency between the transmitter code and the receiver code is performed in step 515, in order to define the signal transmission quality of the light transmission path.

The described and depicted embodiments in the figures are only chosen by way of an example. Different embodiments may be combined in whole or with reference to individual characteristics with each other. It is also possible to supplement one embodiment with the characteristics of another embodiment.

It is further possible to repeat steps of the procedure in accordance with the approach as well as to perform them in a sequence that is different from the one described.

If one design example includes an "and/or" connection between a first characteristic and a second characteristic, this can be understood to mean that this design example consists of the first characteristic as well as the second characteristic according to a first embodiment, and either only the first characteristic or only the second characteristic according to a further embodiment.

REFERENCE SIGNS

100 A device for determining a signal transmission quality of a light transmission path
105 Light transmission path
110 Receiving unit
115 Reading unit
120 Detection unit
125 Transmitter code
130 Receiver code
135 Light transmitter
140 Light receiver
145 Coding unit
200 Photoelectric sensor arrangement
201 First light barrier
203 Second light barrier
205 Additional light transmitter
210 Additional light receiver
215 Additional light transmission path
220 Additional transmitter code
300 Gear selection lever
305 Rotary axis
310 Rotatable element
315 First forked photoelectric sensor
317 Second forked photoelectric sensor
320 Ledge
325 Recess
500 A procedure for determining a signal transmission quality of a light transmission path
505 Receiving of a transmitter code
510 Reading in of a receiver code
515 Determining a degree of correspondency between the transmitter code and the receiver code

The invention claimed is:

1. A device for determining a signal transmission quality of a light transmission path which consists of a light transmitter on one end and a light receiver on its other end, the device comprising:
a receiving unit for receiving a transmitter code, wherein the transmitter code represents a signal which is transmitted from the light transmitter to the light receiver;
a reading unit for the reading of a receiver code, wherein the receiver code represents a signal which was provided by the light receiver based on the transmitter code; and
a detection unit for determining a degree of correspondency between the transmitter code and the receiver code in order to define the signal transmission quality of the light transmission path.

2. The device of claim 1, wherein the device is a pear selection lever for an automatic transmission.

3. The device of claim 2, wherein the gear selection lever is a rotary selector with a central axis perpendicular to the gear selection lever, the device further comprising:
a first light transmitter at one end of a first light transmission path and first light receiver at the opposite end of the first light transmission path;
a second light transmitter at one end of a second light transmission path and second light receiver at the opposite end of the second light transmission path;
a hollow rotatable element comprising a ledge with a plurality of recesses, where the ledge is positioned in the first light transmission path and in the second light transmission path, wherein each of the plurality of recess are configured to enable or block the first light transmission path or the second light transmission path when the hollow rotatable element is turned about the central axis.

4. The device of claim 3, wherein the hollow rotatable element is configured to be pressed down along the central axis, wherein the ledge blocks the first light transmission path and the second light transmission path when the hollow rotatable element is pressed down along the central axis.

5. The device of claim 1, further comprising a light transmitter at one end of the light transmission path and a light receiver at the opposite end of the light transmission path.

6. The device of claim 5, further comprising a coding unit configured to provide the transmitter code to the light transmitter.

7. The device of claim 6, wherein the coding unit is a microcontroller that is connected to the light transmitter via universal asynchronous receiver/transmitter.

8. The device of claim 1, further comprising a light transmitter at one end of the light transmission path and a light receiver at the opposite end of the light transmission path and an additional light transmitter at one end of an additional light transmission path and an additional light receiver at the opposite end of the additional light transmission path,
wherein the receiving unit is configured to receive an additional transmitter code wherein the additional transmitter code represents a signal which is transmitted from the additional light transmitter to the additional light receiver,
wherein the reading unit is configured to read an additional receiver code, wherein the additional receiver code represents a signal which was provided by the additional light receiver based on the additional transmitter code,
wherein the detection unit is configured to determine a degree of correspondency between the additional transmitter code and the additional receiver code in order to define the signal transmission quality of the additional light transmission path.

9. A method for determining a signal transmission quality of a light transmission path, which consists of a light transmitter on one end and a light receiver on its other end, wherein the method comprises the following steps:
receiving of a transmitter code, wherein the transmitter code represents a signal which is transmitted from the light transmitter to the light receiver;
reading of a receiver code, wherein the receiver code represents a signal which was provided by the light receiver based on the transmitter code; and
determining of a degree of correspondency between the transmitter code and the receiver code in order to define the signal transmission quality of the light transmission path.

10. The method according to claim 9, further comprising a step of measuring the receiver code signal strength of the signal that is carrying the receiver code and a step of determining the deviation of the receiver code signal strength from a predetermined value.

11. The method according to claim 10, further comprising a step of adjusting a transmitter code signal strength of a signal that is carrying the transmitter code based on the deviation of the receiver code signal strength from the predetermined value.

12. The method according to claim 11, wherein at least two different actions are performed within the step of adjusting, in order to change the transmitter code signal strength.

13. The method according to claim 12, wherein at least one of the two different actions comprises supplying power to the light transmitter through at least two resistors with different values or switching on an additional light transmitter.

14. The method according to claim 9, further comprising a step of receiving an additional transmitter code, wherein the additional transmitter code represents a further signal that is transmitted from the light transmitter to the light receiver, wherein the additional transmitter code is different from the transmitter code that was received in the step of receiving.

15. The method according to claim 9, wherein a binary code is received as the transmitter code in the step of receiving and a binary code is read in as the receiver code in the step of reading.

16. The method according to claim 9, wherein at least one additional transmitter code is further received in the step of receiving, wherein this at least one additional transmitter code represents a signal that was transmitted from at least one additional light transmitter to at least one additional light receiver, wherein the at least one additional light transmitter is arranged on at least one end of at least one additional light transmission path and the at least one additional light receiver on another end of the at least one additional light transmission path, wherein the at least one additional transmitter code is different from the transmitter code, wherein at least one additional receiver code is further read in the step of reading, wherein the at least one additional receiver code represents a signal that was provided by the at least one additional light receiver based on the at least one additional transmitter code, and wherein a degree of correspondency between the at least one additional transmitter code and the at least one additional receiver code is determined in the step of determining in order to define the signal transmission quality of the at least one additional light transmission path.

17. The method according to claim 16, wherein a code is received in the step of receiving as an additional transmitter code that corresponds to an inverted transmitter code.

18. A computer program product with a program code configured to perform the method according to claim 9.

19. The method according to claim 9, wherein a binary code is received as the transmitter code in the step of receiving or a binary code is read in as the receiver code in the step of reading.

20. The method according to claim 9, further comprising a step of providing the transmitter code to the light transmitter via a universal asynchronous receiver/transmitter.

* * * * *

UNITED STATES PATENT AND TRADEMARK OFFICE
CERTIFICATE OF CORRECTION

PATENT NO. : 10,014,932 B2
APPLICATION NO. : 15/038881
DATED : July 3, 2018
INVENTOR(S) : Thomas Erdmann et al.

It is certified that error appears in the above-identified patent and that said Letters Patent is hereby corrected as shown below:

In the Claims

In Column 11, Claim 2, Line 57, at the end of the line, delete "pear" and replace with -- gear --

Signed and Sealed this
Fourteenth Day of May, 2019

Andrei Iancu
*Director of the United States Patent and Trademark Office*